United States Patent Office 3,347,933
Patented Oct. 17, 1967

3,347,933
O-MONOALKOXYBENZYLHYDROXYL AMINES
Edward L. Schumann, Portage Township, Kalamazoo County, Mich., assignor to The Upjohn Company, Kalamazoo, Mich., a corporation of Delaware
No Drawing. Filed Feb. 25, 1963, Ser. No. 260,829
3 Claims. (Cl. 260—612)

This application is a continuation-in-part of application Serial No. 177,227, filed March 5, 1962, and now Patent No. 3,167,563.

This invention pertains to novel organic chemical compounds, and to a novel process for preparing the same. More particularly, the invention is directed to O-monoalkoxybenzylhydroxylamines, and to the process of preparing them from monoalkoxybenzyl alcohols and chloramine.

The novel O-monoalkoxybenzylhydroxylamines of this invention comprise compounds represented by the following structural formula:

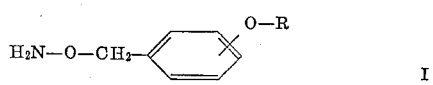

wherein R is alkyl of from 1 to 6 carbon atoms, inclusive, for example, methyl, ethyl, propyl, butyl, amyl, hexyl, and isomeric forms thereof.

The novel free base compounds of Formula I form acid addition salts with acids, which acid addition salts are contemplated as an embodiment of the invention.

The novel free bases (compounds of Formula I, above) and acid addition salts of this invention are useful chemical compounds. They exhibit activity as enzyme inhibitors, for example, they inhibit 5-hydroxytryptophan decarboxylase. The compounds are active as central nervous system depressants, and are useful to effect sedation and tranquilization in mammals, birds, and other animals when administered orally or parenterally. The compounds are also active against fungi, for example, *Microsporum canis, Trichophyton rubrum, Alternaria solani, Fusarium oxysporum,* and *Sclerotinia fructicola* and can be used to treat infections in plants, mammals, birds, and other animals caused by such fungi, or for inhibiting the growth of such fungi on inanimate objects. The O-monoalkoxybenzylhydroxylamines are also useful for reacting with acylpyridines in order to prepare O-(ring-substituted)benzyl ethers of acylpyridineoximes which in turn can be N-oxidized to produce O-(ring-substituted)benzyl ethers of acylpyridineoxime 1-oxides having pharmacologic activity, especially anticonvulsant activity.

The novel free base compounds of the invention are readily prepared by reacting an alkoxybenzyl alcohol of the formula

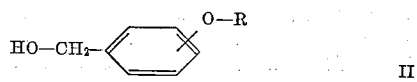

wherein R is as defined above with sodium and chloramine according to the method described by Theilacker et al., Angew. Chem. 68, 303 (1956). See also Mamalis et al., J. Chem. Soc. 229 (1960).

Many of the alkoxybenzyl alcohols within the scope of Formula II are known compounds, for example, o-methoxybenzyl alcohol, m-methoxybenzyl alcohol, p-methoxybenzyl alcohol, o-ethoxybenzyl alcohol, p-ethoxybenzyl alcohol, o-propoxybenzyl alcohol, p-propoxybenzyl alcohol, p-isopropoxybenzyl alcohol, o-butoxybenzyl alcohol, o-sec.butoxybenzyl alcohol, p-butoxybenzyl alcohol, p-sec.butoxybenzyl alcohol, o-isopentyloxybenzyl alcohol, p-pentyloxybenzyl alcohol and o-n-hexyloxybenzyl alcohol. Other alkoxybenzyl alcohols can be readily prepared from o-, m-, and p-hydroxybenzoic acids by alkylation with an alkyl halide in the presence of a strong base, e.g., sodium hydroxide, followed by reduction of the alkoxybenzoic acid thus obtained to the corresponding alkoxybenzyl alcohol. Conveniently, reduction is accomplished with, for example, lithium aluminum hydride. The alkoxybenzyl alcohols can also be prepared from o-, m-, and p-bromophenols by alkylation with an alkyl halide in the presence of a strong base, e.g., sodium hydroxide, conversion of the resulting alkoxybromobenzene to the corresponding Grignard reagent, and treatment of the latter with formaldehyde to obtain the alkoxybenzyl alcohol.

Novel acid addition salts of the free base compounds of Formula I above are prepared by neutralizing the free base in aqueous or nonaqueous medium with a desired acid, illustratively, a pharmacologically acceptable organic or inorganic acid, for example, hydrochloric, hydrobromic, sulfuric, phosphoric, tartaric, citric, acetic, succinic, and like acids. Salts of these and even toxic acids are useful in purifying the free bases.

The free base compounds of Formula I can be reacted with fluosilicic acid to form fluosilicate salts in accordance with U.S. Patents 1,915,334 and 2,075,359. The amine fluosilicate salts thus obtained are effective as mothproofing agents. The compounds can also be used in accordance with U.S. Patents 2,425,320 and 2,606,155 to form amine thiocyanate-formaldehyde condensation products for use as pickling inhibitors.

The following examples are illustrative of the process and products of the present invention, but are not to be construed as limiting.

*Example 1.—Preparation of O-p-methoxybenzylhydroxylamine hydrochloride*

A solution of 5.7 g. (0.25 mole) of sodium in 300 g. (2.2 moles) of p-methoxybenzyl alcohol (warmed to complete solution) was mixed with stirring at a temperature of about 25° C. with a solution of 0.25 mole of chloramine in 300 ml. of anhydrous ether [prepared according to Inorganic Syntheses, I, p. 59, (1939)]. After continued stirring of the reaction mixture at about 25° C. for an additional 1.5 hrs., the mixture was poured into 3.5 l. of anhydrous ether and filtered. The filtrate containing O-p-methoxybenzylhydroxylamine free base was treated with a solution of hydrogen chloride in anhydrous ether and the crude product separated as a purple solid which decomposed at 210° C. The solid was recrystallized from methanol-anhydrous ether to give 28.7 g. (61% yield) of O-p-methoxybenzylhydroxylamine hydrochloride as white flakes which decomposed at 216° C.

*Analysis.*—Calcd. for $C_8H_{11}NO_2 \cdot HCl$: C, 50.66; H, 6.38; N, 7.39; Cl, 18.70. Found: C, 50.70; H, 6.14; N, 7.65; Cl, 18.82.

*Example 2*

Following the procedure of Example 1, but substituting o-n-hexyloxybenzyl alcohol, p-isopropoxybenzyl alcohol, and m-methoxybenzyl alcohol for p-methoxybenzyl alcohol, there are prepared O-o-n-hexyloxybenzylhydroxylamine hydrochloride, O-p-isopropoxybenzylhydroxylamine hydrochloride, and O-m-methoxybenzylhydroxylamine hydrochloride, respectively.

When used in therapy as central nervous system depressants, the novel O-monoalkoxybenzylhydroxylamines in the form of the free base or in the form of acid addition salts with pharmacologically acceptable acids, can be formulated in novel unit dosage compositions for administration via oral or parenteral routes.

As employed herein, "unit dosage" means that quantity or amount of a composition which is physically separable and contains a readily determinable quantity of active ingredient. The proportion of active ingredient in a unit dosage is determined by (*a*) the individual characteristics of the active ingredient and the carrier and (*b*) the therapeutic effect desired. Representative unit dosages are, e.g., a tablet, a capsule, a pill, a powder packet, a wafer, a cachet, a teaspoonful, a tablespoonful, a drop, a cubic centimeter, and segregated multiples thereof.

Unit dosage compositions for oral administration can be formulated with a pharmaceutical carrier in solid or liquid forms. Suitable solid forms include tablets, pills, capsules, granules, powders, wafers, and cachets. Advantageously, the pharmaceutical carrier for such solid forms includes, e.g., cornstarch, lactose, dicalcium phosphate, terra alba (calcium sulfate), talc, stearic acid, magnesium stearate, gums, and functionally similar materials. The tablets or pills can be laminated or otherwise compounded to provide unit dosages affording the advantage of prolonged or delayed action or of predetermined sequential release of the medication. For example, the tablet or pill can be compounded with concentric laminae. The laminae are separated by enteric coating, for example, one which resists disintegration in the stomach, or otherwise permits the inner laminae to pass intact through the stomach into the duodenum for release there or further in the intestines. A variety of substances can be used for such enteric layers or coatings; representative ones include a number of polymeric acids or mixtures of polymeric acids with such materials as shellac, shellac and cetyl alcohol, cellulose acetate phthalate, and the like. A particularly advantageous enteric coating comprises a styrene-maleic acid copolymer.

Suitable liquid forms include solutions, suspensions, and emulsions. Advantageously, the pharmaceutical carrier for such liquid forms comprises water, oils, and oil-water emulsions, and the like. If desired, suitable dispersing or suspending agents can be included, for example, tragacanth, acacia, alginates, dextran, sodium carboxymethylcellulose, methylcellulose, polyvinylpyrrolidone, gelatin, and mixtures thereof. Oils suitable for solutions and oil-water emulsions include cottonseed oil, sesame oil, cocoanut oil, and peanut oil. Liquid compositions can contain from about 1% to about 50%, weight by volume, of the active ingredient.

For parenteral administration the O-monoalkoxybenzylhydroxylamines and their acid addition salts can be formulated in dilute sterile aqueous solutions, aqueous suspensions, and oil solutions or suspensions, for intramuscular or intraperitoneal injections, or like routes.

The dosage of O-monoalkoxybenzylhydroxylamine depends upon the route of administration, and the circumstances of treatment (e.g., severity of the condition to be treated and the duration of treatment), as well as the patient's age, weight, and general physical condition. In general, a total daily dosage of from about 1 to about 50 mg./kg. of body weight is effective. Single daily, divided daily, or intermittent schedules can be employed.

For example, the novel compounds of Formula I of this invention can be administered to adults in single doses of from about 25 to about 500 mg. given 1 to 4 times daily to a total daily dose of from about 25 to about 2000 mg. Single oral doses of 5 ml. (1 teaspoonful) containing from about 1% to about 20% active ingredient are preferred for liquid preparations.

Where a combination of pharmacologic effects is desired, compositions containing, in addition to the aforesaid principal active ingredients, one or more of the following secondary active ingredients can be employed advantageously: additional tranquilizers such as reserpine, chlorpromazine, meprobamate, and ectylurea; psychic energizers such as methylphenidate hydrochloride and α-ethyltryptamine acetate; sedatives such as glutethimide, petrichloral, chloral hydrate, and methyprylon; hypotensive agents such as phenoxybenzamine hydrochloride; analgesics such as aspirin, phenacetin, salicylamide, N-acetyl-p-aminophenol, and codeine; antispasmodics such as methscopolamine bromide and propantheline bromide; anticonvulsants such as diphenylhydantoin, paramethadione, phenylacetylurea, and phensuxamide; and muscle relaxants such as chlorzoxazone, carisoprodol, and phena- glycodol. The amounts of the foregoing secondary active ingredients to be incorporated in the present compositions should not exceed the amounts comprising individual doses of the said secondary active ingredients where they are employed singly.

Example 3

Ten thousand (10,000) scored tablets for oral use, each containing 200 mg. of O-p-methoxybenzylhydroxylamine hydrochloride, are prepared from the following ingredients:

| | G. |
|---|---|
| O-p-methoxybenzylhydroxylamine hydrochloride | 2000 |
| Starch U.S.P. | 170 |
| Talc U.S.P. | 130 |
| Lactose U.S.P. | 2600 |
| Sucrose powder U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets.

Example 4

Ten thousand (10,000) two-piece hard gelatin capsules for oral use, each containing 100 mg. of O-p-methoxybenzylhydroxylamine hydrochloride, are prepared from the following ingredients:

| | G. |
|---|---|
| O-p-methoxybenzylhydroxylamine hydrochloride | 1000 |
| Lactose U.S.P. | 750 |
| Starch U.S.P. | 300 |
| Talc U.S.P. | 65 |
| Calcium stearate | 25 |

One of two capsules are administered every 4 hours for tranquilizing the subject.

Example 5

One-piece soft elastic capsules for oral use, each containing 75 mg. of O-p-methoxybenzylhydroxylamine hydrochloride, are prepared in the usual manner by first dispersing the powdered active material in sufficient corn oil for encapsulation.

Example 6

Ten thousand (10,000) two-piece hard gelatin capsules for oral use, each containing 100 mg. of O-p-methoxybenzylhydroxylamine hydrochloride, and 65 mg. of ethoxazolamide, are prepared from the following ingredients:

| | G. |
|---|---|
| O-p-methoxybenzylhydroxylamine hydrochloride | 1000 |
| Ethoxazolamide | 650 |
| Corn starch U.S.P. | 500 |
| Magnesium stearate | 25 |
| Talc U.S.P. | 65 |

Example 7

Ten thousand (10,000) tablets for oral use, each containing 150 mg. of O-p-methoxybenzylhydroxylamine hydrochloride, 1 mg. of methylprednisolone, and 300 mg. of aspirin, are prepared from the following ingredients:

| | G. |
|---|---|
| O-p-methoxybenzylhydroxylamine hydrochloride | 1500 |
| Aspirin | 3000 |
| Starch | 750 |
| Magnesium stearate | 25 |
| Talc | 50 |

The ingredients are mixed carefully and slugged. The slugs are broken into granules which are compressed into tablets of the correct weight.

I claim:
1. Compounds selected from the group consisting of
(1) O-monoalkoxybenzylhydroxylamines of the formula

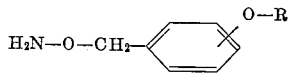

wherein R is alkyl of from 1 to 6 carbon atoms, inclusive, and (2) acid addition salts thereof.
2. O-p-methoxybenzylhydroxylamine hydrochloride.
3. O-p-methoxybenzylhydroxylamine.

References Cited

Fuller et al., Jour. Chem. Soc. (London), 1947, pp. 963–969.

Mamalis et al., Jour. Chem. Soc. (London), 1960, pp. 229–238.

Price et al., Brit. Jour. Pharmacology and Chemotherapy, vol. 15 (1960), pp. 243–246.

BERNARD HELFIN, *Primary Examiner.*